United States Patent
Sugiyama (10) Patent No.: US 8,078,015 B2
(45) Date of Patent: Dec. 13, 2011

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 12/634,273

(22) Filed: Dec. 9, 2009

(65) Prior Publication Data

US 2010/0202784 A1    Aug. 12, 2010

(30) Foreign Application Priority Data

Feb. 10, 2009  (JP) ................................ 2009-029003

(51) Int. Cl.
G02F 1/035 (2006.01)
(52) U.S. Cl. ............................................. 385/3; 385/14
(58) Field of Classification Search .................. 385/2, 3, 385/14, 39, 40
See application file for complete search history.

(56) References Cited

U.S. PATENT DOCUMENTS

| | | | |
|---|---|---|---|
| 5,488,677 A * | 1/1996 | Tokano | 385/3 |
| 5,832,155 A * | 11/1998 | Rasch et al. | 385/48 |
| 7,228,019 B2 * | 6/2007 | Takahashi | 385/14 |
| 2008/0112710 A1 | 5/2008 | Tanaka | |
| 2009/0238512 A1 * | 9/2009 | Sugiyama | 385/2 |
| 2009/0324157 A1 * | 12/2009 | Sugiyama | 385/2 |
| 2010/0232737 A1 * | 9/2010 | Sugiyama et al. | 385/2 |
| 2010/0316326 A1 * | 12/2010 | Sugiyama | 385/3 |
| 2011/0188799 A1 * | 8/2011 | Sugiyama | 385/3 |

FOREIGN PATENT DOCUMENTS

JP    2008-122786    5/2008

* cited by examiner

*Primary Examiner* — Sarah Hahm
(74) *Attorney, Agent, or Firm* — Fujitsu Patent Center (57) ABSTRACT

In an optical modulator, lights that have been branched by an input optical branching section are input via curved waveguides to a plurality of optical modulation sections arranged in parallel on the same substrate. In the optical modulation sections, optical branching sections of an MZ type optical waveguide are arranged shifted to an output side in the longitudinal direction (x direction) of the substrate, corresponding to an arrangement of input ends of signal electrodes. As a result, even if the input ends of the signal electrodes of the respective optical modulation sections are arranged side by side with a predetermined spacing on one side face of the substrate, input light can be applied to the respective optical modulation sections at low loss, without incurring an increase in the drive voltage.

17 Claims, 7 Drawing Sheets

FIG.1

RELATED ART

FIG.2

RELATED ART

OPTICAL MODULATOR

CROSS-REFERENCE TO RELATED APPLICATION

This application is based upon and claims the benefit of priority of the prior Japanese Patent Application No. 2009-029003, filed on Feb. 10, 2009, the entire contents of which are incorporated herein by reference.

FIELD

The embodiment relates to an optical modulator which is an optical waveguide device used in optical communication, and is configured with a plurality of Mach-Zehnder (MZ) type modulation sections arranged in parallel on a single substrate.

BACKGROUND

An optical waveguide device that uses an electro-optic crystal such as lithium niobate ($LiNbO_3$) or lithium tantalate ($LiTaO_2$), is formed by forming a metal film of titanium (Ti) or the like on a part of a crystal substrate, to be thermally defused, or to be patterned, after which it is proton exchanged or the like in benzoic acid, to form an optical waveguide, and thereafter an electrode is provided in the vicinity of the optical waveguide. As such an optical waveguide device that uses an electro-optic crystal, there is known for example an optical modulator as illustrated in FIG. 1.

Figure 1:
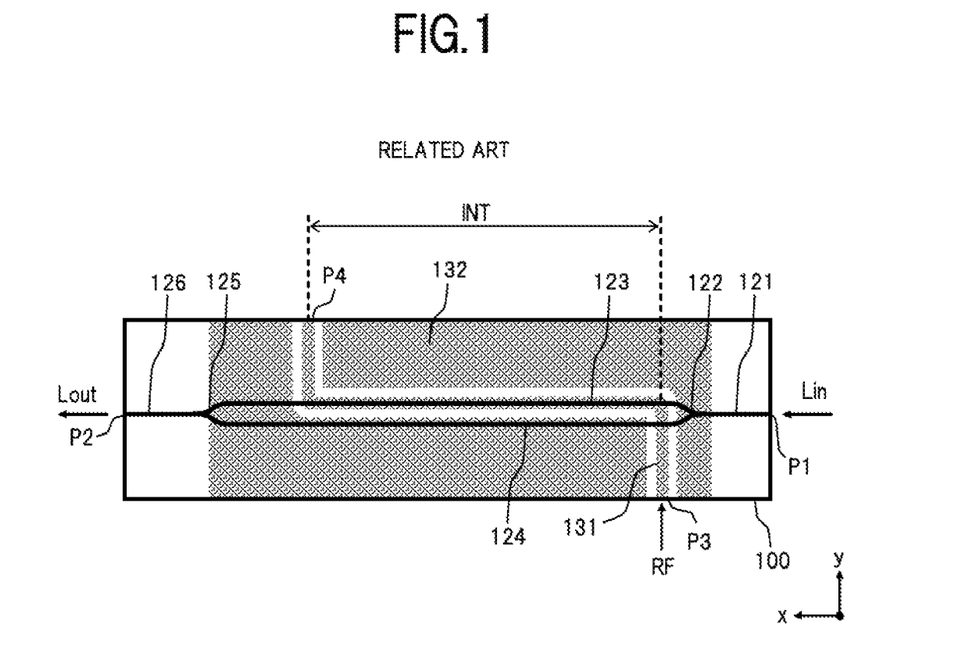
FIG. 1 is a plan view illustrating a configuration example of a general Mach-Zehnder type optical modulator.

In FIG. 1, an optical waveguide formed on a substrate 100 comprises; an input waveguide 121, an optical branching section 122, a pair of branching waveguides 123 and 124, an optical multiplexing section 125, and an output waveguide 126. A signal electrode 131 and an earth electrode 132 are provided on the pair of branching waveguides 123 and 124, to form a coplanar electrode. In the case where a Z-cut substrate is used, in order to use the refractive index variation due to the electric field in the Z direction, the signal electrode 131 and the earth electrode 132 are arranged directly above the optical waveguides. More specifically, the electrodes are patterned with the signal electrode 131 on the branching waveguide 123, and the earth electrode 132 on the branching waveguide 124. Here in order to prevent the light that is propagated through the branching waveguides 123 and 124 from being absorbed by the signal electrode 131 and the earth electrode 132, a buffer layer (not illustrated in the figure) is provided between the substrate 100, and the signal electrode 131 and the earth electrode 132. For the buffer layer, an oxide silicon ($SiO_2$) or the like of 0.2 to 2 μm thickness is used.

In the case where such an optical modulator is driven at high speed, the output end P4 of the signal electrode 131 is connected to the earth electrode 132 via a resistance (not illustrated in the figure) to make a travelling wave electrode, and a microwave electric signal RF is applied from the input end P3 of the signal electrode 131. At this time, due to the electric field generated between the signal electrode 131 and the earth electrode 132, the refractive indices of the branching waveguides 123 and 124 respectively change as +na and −nb, so that the phase difference of the light propagated on the branching waveguides 123 and 124 changes. Therefore, a light Lin input to the input port P1 is intensity modulated by Mach-Zehnder (MZ) interferometer, and modulation light Lout is output from the output port P2. The range INT illustrated by the arrow in the figure, represents the part in which light and electric field interact, and in the following description, this is referred to as the "interaction portion". Furthermore, the longitudinal direction of the substrate 10 (the propagation direction of the light in the interaction portion INT) is the x direction, and the direction perpendicular to the x direction is the y direction. By changing the cross-section shape of the signal electrode 131 to control the effective refractive index of the microwave electric signal RF, and by matching propagation speeds of the light and the microwave electric signal with each other, high speed optical response characteristics can be obtained.

Furthermore, due to the variety of recent optical modulation formats (for example multi-valued modulation format, optical polarization division multiplexing format, and the like), there are many cases where signals corresponding to a desired optical modulation format are generated, by combining a number of conventional optical modulators such as illustrated in FIG. 1 (for example, refer to Japanese Laid-open Patent Publication No. 2008-122786).

In the above described configuration where a plurality of optical modulators are combined, in order to reduce the size of the overall optical modulator, it is effective to integrate respective optical modulators on a single chip (substrate). In the following description, individual optical modulators integrated on a single chip is referred to as "an optical modulation section".

Figure 2:
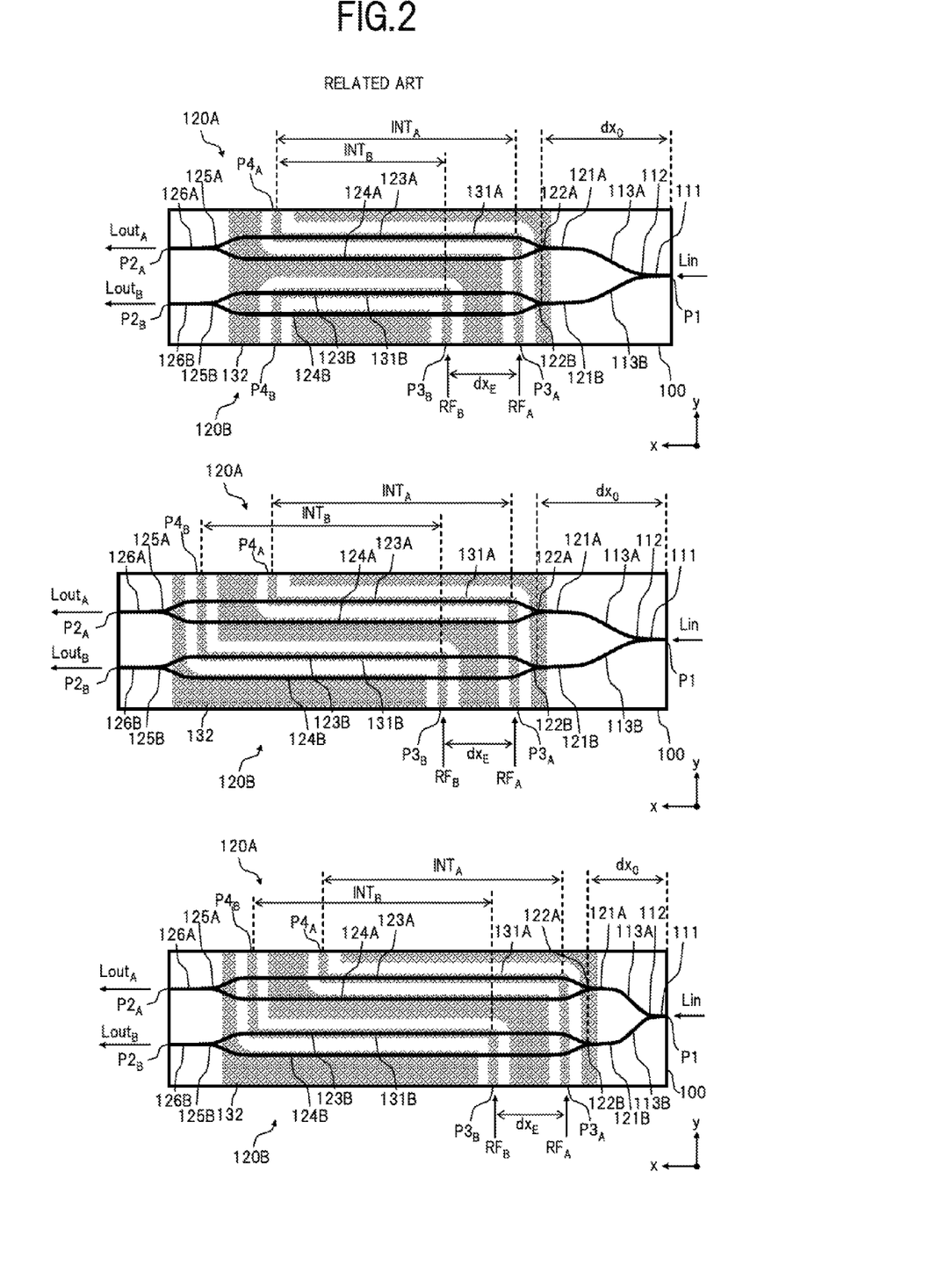
FIG. 2 is a plan view illustrating a configuration example of a case where two optical modulation sections are arranged in parallel on a single substrate.

More specifically, the optical modulator illustrated in FIG. 2 is a configuration example of where two optical modulation sections 120A and 120B are arranged in parallel on a single substrate 100. The optical modulation sections 120A and 120B, similarly to the configuration illustrated in FIG. 1, each have an MZ type optical waveguide, a signal electrode, and an earth electrode. Furthermore, as the optical waveguide for inputting light to the respective optical modulation sections 120A and 120B, an input waveguide 111 connected to one input port P1 which is one end face of the substrate 100, is branched into two curved waveguides 113A and 113B by an optical branching section 112, and the respective curved waveguides 113A and 113B are connected to input waveguides 121A and 121B of the respective optical modulation sections.

In the above described configuration, considering to apply electric signals $RF_A$ and $RF_B$ from the outside to signal electrodes 131A and 131B of the respective optical modulation sections 120A and 120B, electrode input terminals are provided in a package (not illustrated in the figure) for accommodating the substrate 100. If electrode input terminals respectively corresponding to the optical modulation sections 120A and 120B are placed side by side on the side face on one side of the package, mounting of the substrate 100 can be facilitated, and the mounting footprint made small. In this case, for the respective signal electrodes 131A and 131B on the substrate 100, electrode pads formed near each of input ends $P3_A$ and $P3_B$ are arranged side by side on one side (the lower side in the figure) of the opposite side faces of the substrate 100.

In the electrode pads near the respective input ends $P3_A$ and $P3_B$, in order to connect to the outside (the electrode input terminals of the package) with wire bonding or the like, it is necessary to have a certain amount of spacing. Therefore, as illustrated at the top of FIG. 2, the location of the start points of the interaction portions $INT_A$ and $INT_B$ in the respective optical modulation sections 120A and 120B are displaced by the spacing $dx_E$ of the input ends $P3_A$ and $P3_B$ of the respective signal electrodes 131A and 131B. As a result, the length of the interaction portion $INT_B$ of one optical modulation section 120B becomes shorter than the length of the interaction portion $INT_A$ of the other optical modulation section 120A, and hence the drive voltage on the optical modulation section 120B side rises.

Instead of making the interaction portion $INT_B$ of the optical modulation section 120B short, then as illustrated at the center of FIG. 2, the size of the substrate 100 is extended in the lengthwise direction (x direction), and the location of the interaction portions $INT_A$ and $INT_B$ of the respective optical modulation sections 120A and 120B are moved in the x direction corresponding to the spacing $dx_E$ of the input ends $P3_A$ and $P3_B$ of the respective signal electrodes 131A and 131B, so that the length of the respective interaction portions $INT_A$ and $INT_B$ can be made equal. Here, the output ends $P4_A$ and $P4_B$ of the respective signal electrodes 131A and 131B are arranged side by side on the other face (the upper face in the figure) of the opposite side faces of the substrate 100. However this configuration incurs a lengthening of the size of the package and enlargement of the optical modulator. Furthermore, the number of chips (substrates 100) that can be cut from a single chip is reduced, so that manufacturing costs are increased.

In order to arrange the electrode pads of the respective signal electrodes 131A and 131B side by side on one side of the substrate 100 without shortening the interaction portion or extending the substrate size in the longitudinal direction, then as illustrated at the bottom of FIG. 2, it is necessary to shorten the length $dx_0$ from the end face (hereunder referred to as the input end face) where the input port P1 of the substrate 100 is located, to the optical branching sections 122A and 122B of the respective optical modulation sections 120A and 120B. However, in this case, the radii of curvature of the respective curved waveguides 113A and 113B becomes small. Therefore the bend loss (radiation loss) in the curved waveguides 113A and 113B is increased, and the input light intensity of the respective optical modulation sections 120A and 120B is reduced.

SUMMARY

According to an aspect of the invention, an optical modulator includes a plurality of optical modulation sections which are arranged in parallel on a same substrate having an electro-optic effect, in the respective optical modulation sections, a Mach-Zehnder type optical waveguide is formed on the substrate, and a signal electrode and an earth electrode are provided along a pair of branching waveguides that are disposed between an optical branching section and an optical multiplexing section of the Mach-Zehnder type optical waveguide, that perform modulation of light that propagates on the Mach-Zehnder type optical waveguide by applying an electric signal corresponding to modulation data to the signal electrode that is a travelling wave electrode. This optical modulator includes; an input optical branching section that branches light input from a single input port arranged on an input end face of the substrate into a plurality of lights, and a plurality of curved waveguides that guide the lights branched by the input optical branching section to input ends of the Mach-Zehnder type optical waveguides of the respective optical modulation sections. Furthermore, in the signal electrodes of the respective optical modulation sections, each of the input ends to which the electric signal is applied are arranged side by side with a predetermined spacing on one side face of opposite side faces that intersect with the input end face of the substrate. Moreover, the optical branching sections of the respective optical modulation sections are arranged shifted to the output side in a first direction parallel with the opposite side faces of the substrate, corresponding to the arrangement of the input ends of the signal electrodes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder is a detailed description of embodiments of the invention, with reference to the drawings.

Figure 3:
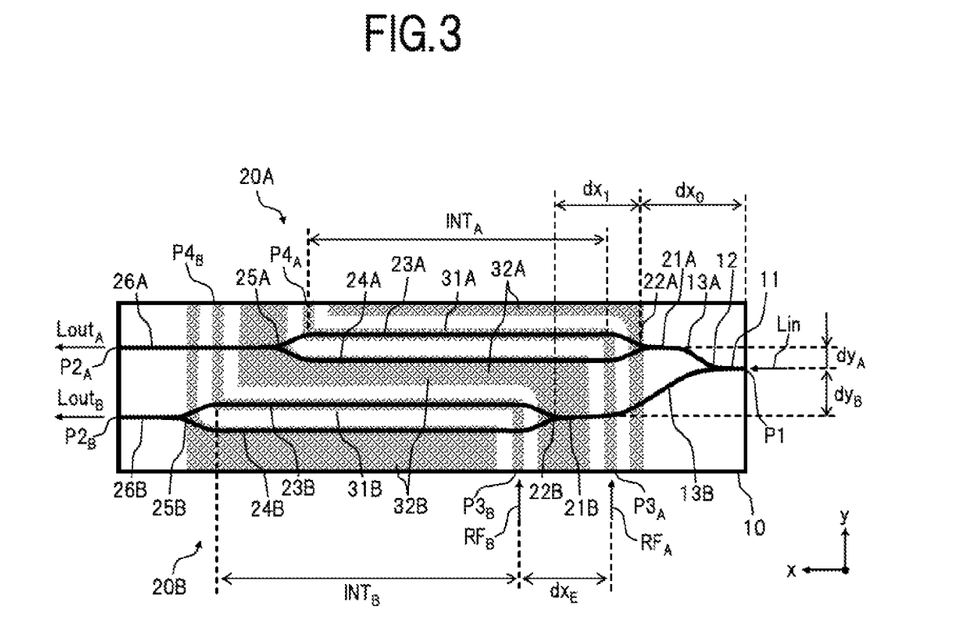
FIG. 3 is a plan view illustrating a configuration of an optical modulator according to a first embodiment.

FIG. 3 is a plan view illustrating a configuration of an optical modulator according to a first embodiment.

In FIG. 3, in the optical modulator of this embodiment, on a single crystal substrate 10 of, for example, $LiNbO_3$ or $LiTaO_2$ having an electro-optic effect, there is arranged in parallel, two optical modulation sections 20A and 20B. For the substrate 10, here a Z-cut crystal is used, and on one end face thereof (the right end face in the figure) is arranged a single input port P1 that is common with the respective optical modulation sections 20A and 20B, and on the other end face (the left end face in the figure) there is arranged two output ports $P2_A$ and $P2_B$ respectively corresponding to the optical modulation sections 20A and 20B. In this embodiment also, the propagation direction (the longitudinal direction of the substrate 10) of the light in the interaction portions $INT_A$ and $INT_B$ of the respective optical modulation sections 20A and 20B is the x direction, and the direction perpendicular to the x direction is the y direction.

One end of one input waveguide 11 is connected to the input port P1. The other end of the input waveguide 11 is connected to the input end of an input optical branching section 12, and the input ends of the optical modulation sections 20A and 20B are respectively connected to the two output ends of the input optical branching section 12 via curved waveguides 13A and 13B. The input optical branching section 12 branches the input light into two at a required intensity ratio and outputs this. The respective curved waveguides 13A and 13B are made gentle approximate S shapes, and each have different lengths corresponding to the displacement of the position of later mentioned optical branching sections 22A and 22B of the respective optical modulation sections 20A and 20B. However, the radii of curvature of the curved waveguides 13A and 13B are approximately the same.

The optical modulation section 20A is formed on the surface portion located on the upper side in the figure of the substrate 10, and is provided with: a Mach-Zehnder (MZ) type optical waveguide comprising an input waveguide 21A, an optical branching section 22A, a pair of branching waveguides 23A and 24A, an optical multiplexing section 25A, and an output waveguide 26A; and a signal electrode 31A and an earth electrode 32A that are patterned along the pair of branching waveguides 23A and 24A.

The input waveguide 21A has one end connected to the curved waveguide 13A, and to the other end is connected the input end of the optical branching section 22A.

In the optical branching section 22A, light propagated on the input waveguide 21A is branched into two at an intensity ratio of 1:1. To the two output ends of the optical branching section 22A is respectively connected each end of the pair of branching waveguides 23A and 24A. Regarding the arrangement of the optical branching section 22A on the substrate 10, in the x direction the spacing to the input end face (the right end face where the input port P1 is positioned) of the substrate 10 is $dx_0$, and in the y direction the spacing to the input optical branching section 12 is $dy_A$. For the positions of the optical branching sections in this description, the branching point (intersection of the Y branch) is made the reference.

In the pair of branching waveguides 23A and 24A, the branching waveguide 23A positioned on the upper side in the figure, and the branching waveguide 24A positioned on the lower side in the figure, are parallel with the x direction.

In the optical multiplexing section 25A, the two input ends are respectively connected to the other ends of the branching waveguides 23A and 24A, and the lights propagated on the branching waveguides 23A and 24A are multiplexed into one. To the one output end of the optical multiplexing section 25A is connected one end of the output waveguide 26A.

The output waveguide 26A outputs the light that has been multiplexed by the optical multiplexing section 25A, to the outside from the output port $P2_A$ connected to the other end.

The signal electrode 31A is formed along directly above the branching waveguide 23A.

The earth electrode 32A is separated from the signal electrode 31A, and also is formed to include the portion along directly above the branching waveguide 24A. Here the earth electrode 32A formed between the branching waveguide 24A and a later described branching waveguide 23B of the optical modulation section 20B, is common to a later described earth electrode 32B of the optical modulation section 20B.

The signal electrode 31A constitutes a travelling wave electrode in which an output end $P4_A$ leading to one side face (the side face on the upper side in the figure) of the opposite side faces parallel with the longitudinal direction of the substrate 10, is connected to the earth electrode 32A via a resistor (not illustrated in the figure), and a microwave electric signal $RF_A$ (electric signal corresponding to modulation data) is applied from the input end $P3_A$ leading to the other side face (the side face on the lower side in the figure) of the substrate 10.

For the signal electrode 31A and the earth electrode 32A, these may be formed on the substrate 10 (optical waveguide) via a buffer layer that uses $SiO_2$ or the like (not illustrated in the figure). By providing a buffer layer, the light propagated within the branching waveguides 23A and 24A can be prevented from being absorbed by the signal electrode 31A and the earth electrode 32A.

The optical modulation section 20B is formed on the surface portion located on the lower side in the figure of the substrate 10, and is provided with: a Mach-Zehnder (MZ) type optical waveguide comprising an input waveguide 21B, an optical branching section 22B, a pair of branching waveguides 23B and 24B, an optical multiplexing section 25B, and an output waveguide 26B; and a signal electrode 31B and an earth electrode 32B that are patterned along the pair of branching waveguides 23B and 24B.

The input waveguide 21B has one end connected to the curved waveguide 13B, and to the other end is connected the input end of the optical branching section 22B.

In the optical branching section 22B, light propagated on the input waveguide 21B is branched into two at an intensity ratio of 1:1. To the two output ends of the optical branching section 22B is respectively connected each end of the pair of branching waveguides 23B and 24B.

Regarding the arrangement of the optical branching section 22B on the substrate 10, in the x direction the spacing to the input end face of the substrate 10 is $dx_0+dx_1$, and in the y direction the spacing to the input optical branching section 12 is $dy_B$. In other words, in this relative arrangement of the optical branching section 22A of the optical modulation section 20, the position of the optical branching section 22B of the optical modulation section 20B, is displaced in the x direction by $dx_1$ from the optical branching section 22A to the output end face side (the left end face where the output ports $P2_A$ and $P2_B$ are positioned) of the substrate 10, and is displaced in the y direction by $dy_B$ to the opposite side to the optical branching section 22A with the input optical branching section 12 as a reference, so that $dy_B$ becomes longer than $dy_A$. That is, for the optical branching sections 22A and 22B of the respective optical modulation sections 20A and 20B, the spacing in the x direction is $dx_1$, and the spacing in the y direction is $dy_A+dy_B$ (where $dy_A<dy_B$). The spacing $dx_1$ in the x direction can be set corresponding to the spacing $dx_E$ of the input ends $P3_A$ and $P3_B$ of the respective signal electrodes 31A and 31B. Here $dx_1$ is made equal to $dx_E$.

In the pair of branching waveguides 23B and 24B, the branching waveguide 23B positioned on the upper side in the figure, and the branching waveguide 24B positioned on the lower side in the figure, are parallel with the x direction.

In the optical multiplexing section 25B, the two input ends are respectively connected to the other ends of the branching waveguides 23B and 24B, and the lights propagated on the branching waveguides 23B and 24B are multiplexed into one. To the one output end of the optical multiplexing section 25B is connected one end of the output waveguide 26B.

The output waveguide 26B outputs the light that has been multiplexed by the optical multiplexing section 25B, to the outside from the output port $P2_B$ connected to the other end.

The signal electrode 31B is formed along directly above the branching waveguide 23B.

The earth electrode 32B is separated from the signal electrode 31B, and also is formed to include the portion along directly above the branching waveguide 24B. Here the earth electrode 32B formed between the branching waveguide 23B and the branching waveguide 24A of the optical modulation section 20A, is common to the earth electrode 32A of the optical modulation section 20A.

The signal electrode 31B constitutes a travelling wave electrode in which an output end $P4_B$ leading to one side face (the side face on the upper side in the figure) of the opposite side faces parallel with the longitudinal direction of the substrate 10, is connected to the earth electrode 32B via a resistor (not illustrated in the figure), and a microwave electric signal $RF_B$ (electric signal corresponding to modulation data) is applied from the input end $P3_B$ leading to the other side face (the side face on the lower side in the figure) of the substrate 10. Also for the signal electrode 31B and the earth electrode 32B, these may be formed on the substrate 10 (optical waveguide) via a buffer layer in the same way as for the case described above.

In the above manner, the signal electrodes 31A and 31B of the respective optical modulation sections 20A and 20B are provided with each of their input ends $P3_A$ and $P3_B$ arranged on one side face of the opposite side faces of the substrate 10. Since the electrode pads are each formed in the vicinity of the respective input ends $P3_A$ and $P3_B$, the predetermined spacing $dx_E$ between the respective electrode pads for connecting to the outside by wire bonding or the like is ensured. Furthermore, also for the output ends $P4_A$ and $P4_B$ of the respective signal electrodes 31A and 31B, similar to the input ends $P3_A$ and $P3_B$, these may be provided arranged on the other side face of the opposite side faces of the substrate 10, with the electrode pads for termination formed with the spacing $dx_E$. By arranging the input ends $P3_A$ and $P3_B$ and the output ends $P4_A$ and $P4_B$ of the respective signal electrodes 31A and 31B in this manner, testing and mounting of the substrate 10 is facilitated.

In the optical modulator configured as described above, the optical branching sections 22A and 22B in the MZ type optical waveguides of the respective optical modulation sections 20A and 20B are arranged displaced by $dx_1$ in the x direction, and are arranged in the y direction non symmetrically on either side of the input optical branching section 12 with the spacings to the input optical branching section 12 different to each other. As a result, between the input optical branching section 12 and the optical branching sections 22A and 22B are respectively connected by the curved waveguides 13A and 13B with a large radius of curvature. At this time, if the size of the substrate 10 is to be made similar to the aforementioned case at the top in FIG. 2, the spacing $dx_0$ between the input end face of the substrate 10 and the optical branching section 22A of the optical modulation section 20A becomes shorter than that for the case at the top in FIG. 2, and the spacing $dx_0+dx_1$ between the input end face of the substrate 10 and the optical branching section 22B of the optical modulation section 20B becomes similar to or longer than that for the case at the top in FIG. 2. Furthermore, since the length of the interaction portion $INT_B$ of the optical modulation section 20B, is made the same as the length of the interaction portion $INT_A$ of the optical modulation section 20A, the drive voltages of the respective optical modulation sections 20A and 20B become basically the same level.

The radii of curvature of the curved waveguides 13A and 13B depend on the positions of the respective optical branching sections 22A and 22B. In the case where the spacing $dx_1$ in the x direction of the optical branching sections 22A and 22B is equal to the spacing $dx_E$ of the input ends $P3_A$ and $P3_B$ of the respective signal electrodes 31A and 31B, each of the radii of curvature becomes a maximum. Preferably the radius of curvature of the curved waveguide 13A and the radius of curvature of the curved waveguide 13B are set so as to be equal to each other.

Next is a description of the operation of the optical modulator according to a first embodiment.

At first, output light from a single light source or the like (not illustrated in the figure) is input to the input waveguide 11 from the input port P1 of the present optical modulator. The input light Lin is input to the input optical branching section 12 through the input waveguide 11, and bifurcated according to a required intensity ratio. One of the branched lights output from the input optical branching section 12 is input to the input waveguide 21A of the optical modulation section 20A through the curved waveguide 13A, and the other branched light is input to the input waveguide 21B of the optical modulation section 20B through the curved waveguide 13B.

At this time, the light input to the respective optical modulation sections 20A and 20B is attenuated due to the bend loss in the curved waveguides 13A and 13B. However, in the configuration of the present optical modulator, the relative positions of the input optical branching section 12 and the respective optical modulation sections 20A and 20B on the substrate 10, is devised to correspond to the spacing $dx_E$ of the input ends $P3_A$ and $P3_B$ of the respective signal electrodes 31A and 31B, so that the radii of curvature of the respective curved waveguides 13A and 13B become relatively large values. Therefore attenuation of the input light due to the bend loss is only slight or practically nonexistent.

In the optical modulation section 20A (20B), the light input to the input waveguide 21A (21B) is bifurcated in the optical branching section 22A (22B) according to an intensity ratio of 1:1, and respectively sent to the branching waveguides 23A and 24A (23B and 24B). Here, by applying a microwave electric signal $RF_A$ ($RF_B$) from the input end $P3_A$ ($P3_B$) of the signal electrode 31A (31B), light that has been modulated corresponding to the level of the microwave electric signal $RF_A$ ($RF_B$) passes through the output waveguide 26A (26B) and is output from the output port $P2_A$ ($P2_B$) to the outside.

In the above manner, according to the optical modulator of the first embodiment, even if two of the optical modulation sections 20A and 20B are arranged in parallel on a single substrate 10, and the input ends $P3_A$ and $P3_B$ of each of the signal electrodes 31A and 31B are arranged side by side with a spacing $dx_E$ on one side face of the substrate 10, the input light of the respective optical modulation section 20A and 20B can be applied at low loss without incurring an increase in drive voltage or an enlargement in substrate size. As a result, mounting of the substrate 10 on the package is facilitated, and the mounting footprint is also small. Therefore cost reduction and miniaturization of the optical modulator becomes possible.

Figure 4:
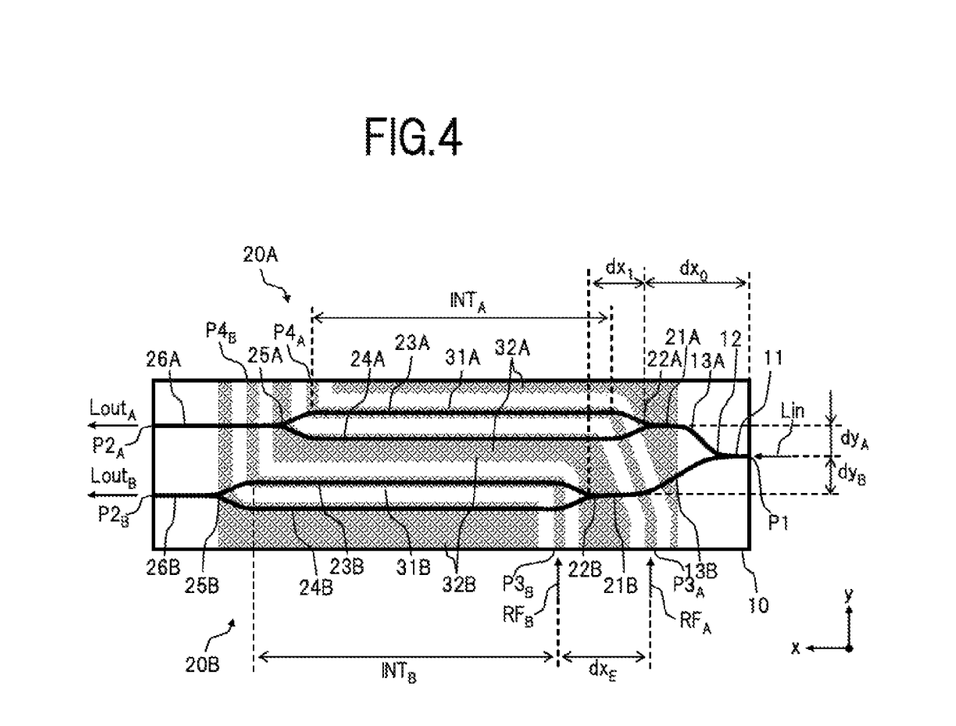
FIG. 4 is a plan view illustrating a configuration of a modified example related to the first embodiment.

In the first embodiment, the example is shown for where the respective optical branching sections 22A and 22B are arranged so that the spacing $dx_1$ in the x direction of the optical branching sections 22A and 22B of the respective optical modulation sections 20A and 20B becomes the same as the spacing $dx_E$ of the input ends $P3_A$ and $P3_B$ of the respective signal electrodes 31A and 31B. However the invention is not limited to this. For example, even if the spacing $dx_1$ of the optical branching sections 22A and 22B becomes narrower than the spacing $dx_E$ of the respective input ends $P3_A$ and $P3_B$, in the case where the radii of curvature of the curved waveguides 13A and 13B can be made sufficiently large, the spacing $dx_1$ of the respective optical branching sections 22A and 22B may be determined to match a value for the radius of curvature where it is possible to suppress the bend loss in the curved waveguides 13A and 13B to below a predetermined value. In this case, as illustrated in FIG. 4, for the signal electrode 31A of the optical modulation section 20A, the input leader line portion from the input end $P3_A$ up until on the branching waveguide 23A (the start point of the interaction portion $INT_A$) may be wired at an incline with an angle with respect to the y direction. As a result, while keeping the spacing of the input ends $P3_A$ and $P3_B$ of the respective signal electrodes 31A and 31B at $dx_E$ ($>dx_1$), the length in the x direction of the substrate 10 can be shortened, so that it is possible to realize an even smaller optical modulator.

Figure 5:
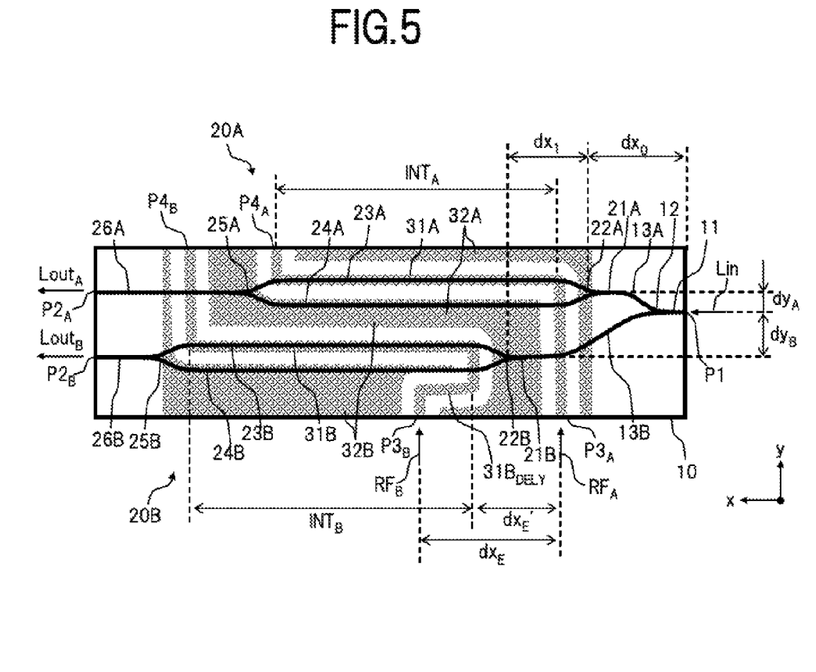
FIG. 5 is a plan view illustrating a configuration of another modified example related to the first embodiment.

Furthermore, in the first embodiment, since the lengths of the input leader line portions from the input ends $P3_A$ and P3$_B$ of the respective signal electrodes 31A and 31B up to on the branching waveguides 23A and 23B are different, then even if the electric signals RF$_A$ and RF$_B$ are applied simultaneously to the input ends P3$_A$ and P3$_B$, the modulation lights output from the respective optical modulation section 20A and 20B cannot be synchronized. In order to synchronize these, the timing of the electric signals RF$_A$ and RF$_B$ may be delayed to correspond to the difference in the length of the input leader line portions of the respective signal electrodes 31A and 31B, or as illustrated in FIG. 5, the input leader line portion of the signal electrode 31B may be bent, so that the length of this portion becomes equal to the length of the input leader line portion of the signal electrode 31A. In the example of FIG. 5, regarding the spacing of the input ends P3$_A$ and P3$_B$ of the respective signal electrodes 31A and 31B, by ensuring the necessary dx$_E$ in the connection to the outside, and bending the input leader line portion of the signal electrode 31B, the spacing in the x direction of the start points of the respective interaction portions INT$_A$ and INT$_B$ becomes dx$_E$' which is narrower than dx$_E$. In this case, the spacing dx$_1$ in the x direction of the respective optical branching sections 22A and 22B may be made so as to be equal to dx$_E$'.

Next is a description of a second embodiment.

Figure 6:
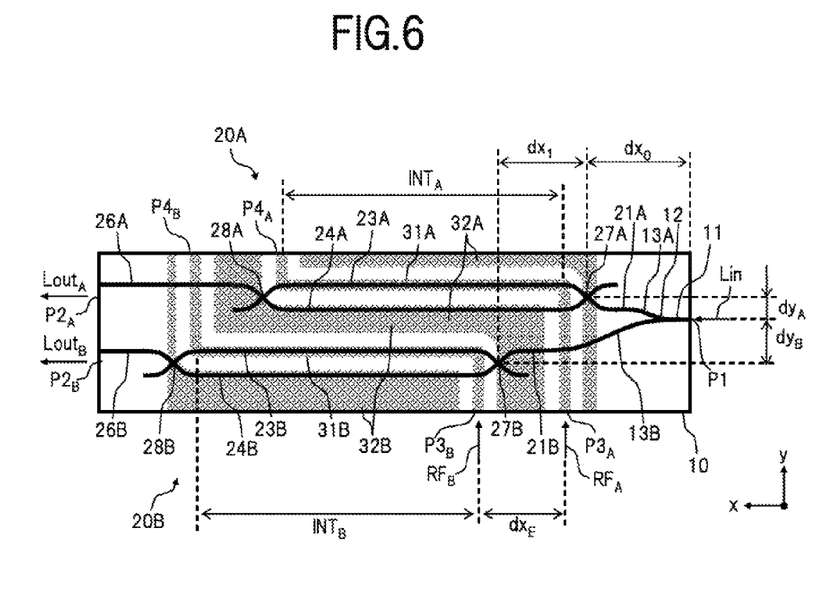
FIG. 6 is plan view illustrating a configuration of an optical modulator according to a second embodiment.

FIG. 6 is a plan view illustrating a configuration of an optical modulator according to the second embodiment. Parts the same as or corresponding to the configuration of the first embodiment illustrated in FIG. 3 are denoted by the same reference symbols and description is omitted. The same also applies for subsequent other embodiments.

In FIG. 6, the point where the configuration of the optical modulator of this embodiment is different to the case of the first embodiment, is that instead of the optical branching sections 22A and 22B and the optical multiplexing sections 25A and 25B that are configured using the Y branching waveguide, there is provided optical branching sections 27A and 27B and optical multiplexing sections 28A and 28B that use a 2×2 optical coupler having two light input ends and two light output ends.

More specifically, in the optical branching section 27A of the optical modulation section 20A, the input waveguide 21A is connected to the light input end that is the closer to the input optical branching section 12 of the two light input ends, and the input light Lin that is bifurcated by the input optical branching section 12 passes through the curved waveguide 13A and the input waveguide 21A and is applied to the aforementioned light input end. One end of each of the branching waveguides 23A and 24A is respectively connected to the two light output ends of the optical branching section 27A, and the light for which the input light to the light input end has been bifurcated at an intensity ratio of 1:1 is output to the branching waveguides 23A and 24A from each light output end. The remaining light input end of the optical branching section 27A is unused.

In the optical multiplexing section 28A of the optical modulation section 20A, the other ends of the branching waveguides 23A and 24A are respectively connected to the two light input ends, and the light that is propagated on the respective branching waveguides 23A and 24B is multiplexed into one, and then the multiplexed light is bifurcated and output. The output waveguide 26A is connected to one light output end of the optical multiplexing section 28A, and the modulation light of the optical modulation section 20A passes through the output waveguide 26A and is output from the output port P2$_A$ to the outside. The other light output end of the optical multiplexing section 28A is left open.

Moreover, in the optical branching section 27B of the optical modulation section 20B, the input waveguide 21B is connected to the light input end that is the closer to the input optical branching section 12 of the two light input ends, and the input light Lin that is bifurcated by the input optical branching section 12 passes through the curved waveguide 13B and the input waveguide 21B and is applied to the aforementioned light input end. One end of each of the branching waveguides 23B and 24B is respectively connected to the two light output ends of the optical branching section 27B, and the light for which the input light to the light input end has been bifurcated at an intensity ratio of 1:1 is output to the branching waveguides 23B and 24B from each light output end. The remaining light input end of the optical branching section 27B is unused.

In the optical multiplexing section 28B of the optical modulation section 20B, the other ends of the branching waveguides 23B and 24B are respectively connected to the two light input ends, and the light that is propagated on the respective branching waveguides 23B and 24B is multiplexed into one, and then the multiplexed light is bifurcated and output. The output waveguide 26B is connected to one light output end of the optical multiplexing section 28B, and the modulation light of the optical modulation section 20B passes through the output waveguide 26B and is output from the output port P2$_B$ to the outside. The other light output end of the optical multiplexing section 28B is left open.

Also in the optical modulator configured as described above, a similar operational effect to the case of the first embodiment can be obtained. Moreover, for the optical branching sections 27A and 27B that use the 2×2 optical coupler, the light input end closer to the input optical branching section 12, of the two light input ends is connected to the curved waveguides 13A and 13B via the input waveguides 21A and 21B. Therefore, the radii of curvature of the respective curved waveguides 13A and 13B can be made large, so that it is possible to apply input light to the respective optical modulation section 20A and 20B at a lower loss. Moreover, instead of making the radii of curvature of the respective curved waveguides 13A and 13B large, the spacing dx$_0$ from the input end side of the substrate 10 up to the optical branching section 22A can also be made short, and hence it is possible to further miniaturize the optical modulator.

Figure 7:
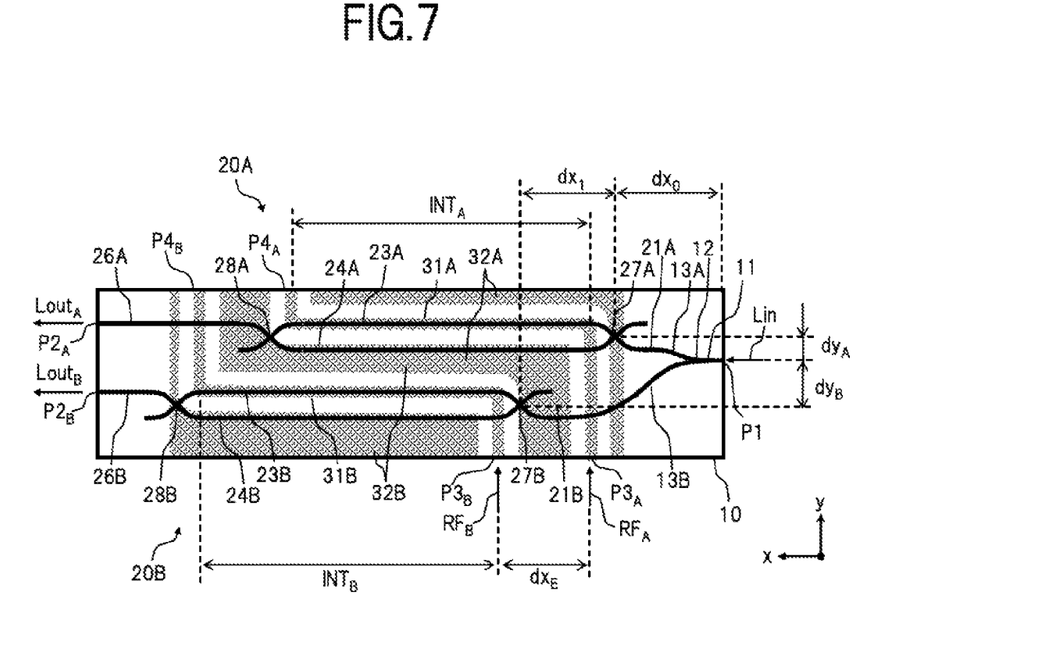
FIG. 7 is a plan view illustrating a configuration of a modified example related to the second embodiment.

In the above second embodiment, the relationship between the light input to the optical branching section 27A in the optical modulation section 20A and the light output from the optical multiplexing section 28A is a cross-port state, whereas the relationship between the light input to the optical branching section 27B in the optical modulation section 20B and the light output from the optical multiplexing section 28B is a through-port state. Therefore, there is the possibility that the extinction ratios of the modulation lights of the respective optical modulation sections 20A and 20B are different. In order to avoid this, for example as illustrated in FIG. 7, in the optical branching section 27B of the optical modulation section 20B, the curved waveguide 13B may be connected via the input waveguide 21B to the light input end that is further from the input optical branching section 12, of the two light input ends, so that the respective optical modulation sections 20A and 20B become the same cross-port state. That is, in the respective optical branching section 27A and 27B, light is applied to the light input end positioned on the same side, of the two light input ends, and in the respective optical multiplexing sections 28A and 28B, light is taken out from the light output end positioned on the same side, of the two light output ends, so that the extinction ratio of the modulation lights of the respective optical modulation sections 20A and 20B can be made the same.

Next is a description of a third embodiment.

Figure 8:
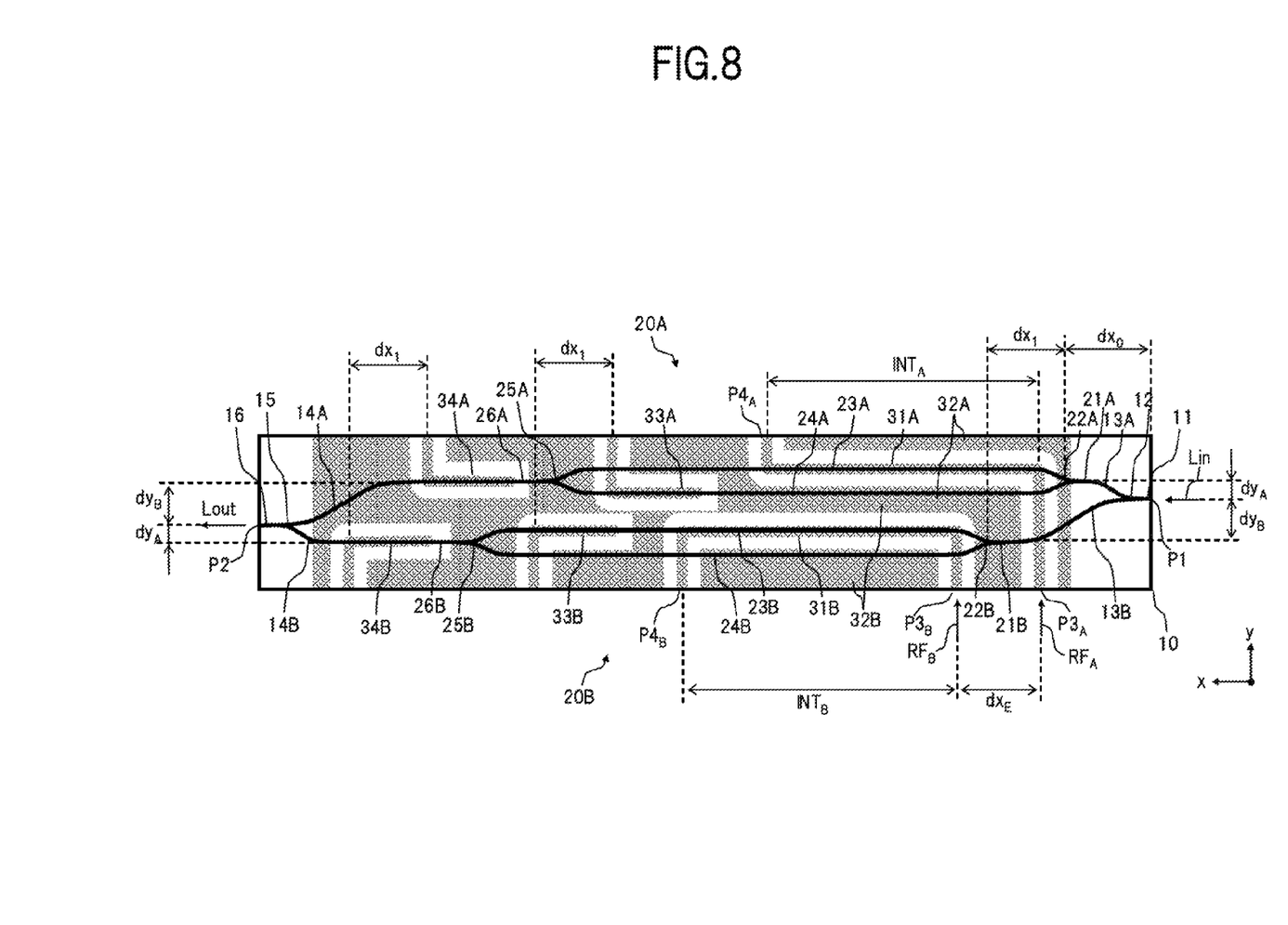
FIG. 8 is a plan view illustrating a configuration of an optical modulator according to a third embodiment.

FIG. 8 is a plan view illustrating a configuration of an optical modulator according to the third embodiment.

In FIG. 8, in the optical modulator of this embodiment, for example in the aforementioned first embodiment illustrated in FIG. 3, DC electrodes 33A and 33B are provided separate to the signal electrodes 31A and 31B of the respective optical modulation sections 20A and 20B, and by adjusting the bias voltage applied to the DC electrodes 33A and 33B, the voltage to switch off the optical output of the respective optical modulation sections 20A and 20B is held constant.

Furthermore, as the optical waveguides for multiplexing the modulation light output from the output waveguides 26A and 26B of the respective optical modulation section 20A and 20B into one, and outputting this, curved waveguides 14A and 14B, an output optical multiplexing section 15, and an output waveguide 16 are formed. The configuration of this optical modulator is a form that includes two child MZ interferometers within a parent MZ interferometer that is formed between the input port P1 and the output port P2, giving a configuration corresponding to an optical modulation format such as differential quadrature phase shift keying (DPQSK) or the like. Here, in the parent MZ interferometer also, DC electrodes 33A and 33B for adjusting the bias voltage are provided.

More specifically, the branching waveguides 23A, 24A, 23B, and 24B, of the respective optical modulation section 20A and 20B are each extended on the output side in order to arrange the DC electrodes 33A and 33B between the finish point of the respective interaction portions $INT_A$ and $INT_B$ and the optical multiplexing sections 25A and 25B. Furthermore, in the signal electrode 31B of the optical modulation section 20B, the patterning is changed so that the output end $P4_B$ is drawn out to the side face on the same side as the input end $P3_B$. Moreover, the output waveguides 26A and 26B of the respective optical modulation sections 20A and 20B are each extended to the outside in order to arrange the DC electrodes 34A and 34B of the parent MZ interferometer.

The DC electrode 33A is formed along directly above the extension portion of the branching waveguide 24A for example, and one end is drawn out to one side face (the side face on the upper side in the figure) of the substrate 10. Furthermore, the DC electrode 33B is formed along directly above the extension portion of the branching waveguide 23B for example, and one end is drawn out to the other side face (the side face on the lower side in the figure) of the substrate 10. Regarding the relative arrangement of the respective DC electrodes 33A and 33B in the x direction, similar to the arrangement of the respective optical branching sections 22A and 22B, the DC electrode 33B is moved by $dx_1$ to the output side from the DC electrode 33A. Preferably the lengths in the x direction of the DC electrodes 33A and 33B (the lengths of the portions overlapping the branching waveguides 24A and 23B) are made approximately equal.

The DC electrode 34A is formed along directly above the extension portion of the output waveguide 26A for example, and one end is drawn out to one side face (the side face on the upper side in the figure) of the substrate 10. Furthermore, the DC electrode 34B is formed along directly above the extension portion of the output waveguide 26B, and one end is drawn out to the other side face (the side face on the lower side in the figure) of the substrate 10. Regarding the relative arrangement of the respective DC electrodes 34A and 34B in the x direction, similar to the arrangement of the respective DC electrodes 33A and 33B, the DC electrode 34B is moved by $dx_1$ to the output side from the DC electrode 34A. Preferably also the lengths in the x direction of the DC electrodes 34A and 34B (the lengths of the portions overlapping the branching waveguides 24A and 23B) are made approximately equal.

The earth electrodes 32A and 32B of the respective optical modulation sections 20A and 20B are extended to the output side corresponding to the DC electrodes 33A, 33B, 34A, and 34B, and are each separated from the respective DC electrodes 33A, 33B, 34A, and 34B.

The curved waveguide 14A is connected between the output waveguide 26A of the optical modulation section 20A and one input end of the output optical multiplexing section 15. Furthermore, the curved waveguide 14B is connected between the output waveguide 26B of the optical modulation section 20B and the other input end of the output optical multiplexing section 15. The curved waveguides 14A and 14B become a gentle approximate S shape, and each have different lengths corresponding to the arrangement of the output optical multiplexing section 15 described later. However, the radii of curvature of the curved waveguides 14A and 14B are approximately the same.

In the output optical multiplexing section 15, the modulation light that has passed through the curved waveguides 14A and 14B and is then applied to the respective input ends is multiplexed into one and output. One end of the output waveguide 16 is connected to one output end of the output optical multiplexing section 15. In the output waveguide 16, the light that has been multiplexed by the output optical multiplexing section 15 is output to the outside from the output port P2 connected to the other end.

The arrangement on the substrate 10 of the output optical multiplexing section 15 is such that in the y direction, the spacing to the optical multiplexing section 25A of the optical modulation section 20A is $dy_B$, and the spacing to the optical multiplexing section 25B of the optical modulation section 20B is $dy_A$. That is, the relative arrangement of the input optical branching sections 12, 22A, and 22B on the input side, and the relative arrangement of the respective output optical multiplexing sections 15, 25A, and 25B on the output side, have a symmetrical relationship in relation to a central point of the parent MZ interferometer. As a result, the optical path lengths of the pair of branch arms positioned between the input optical branching section 12 and the output optical multiplexing section 15 in the parent MZ interferometer, are equal to each other. For the positions of the optical multiplexing sections, the multiplexing point (the intersection of the Y shape waveguide) is made the reference.

In the optical modulator of the above configuration, for example the intensity of the modulation light in the optical modulation sections 20A and 20B is monitored using an output monitor or the like (not illustrated in the figure), and the bias voltage applied to the respective DC electrodes 33A and 33B corresponding to the monitor result is feedback controlled, to thereby keep the voltage for switching off the light output of the optical modulation sections 20A and 20B constant. Furthermore, by adjusting the bias voltage applied to the DC electrodes 33A and 33B, the phase difference of the respective modulation lights that are multiplexed by the output optical multiplexing section 15 can be made a desired state. Moreover, since the optical path lengths of the pair of branch arms in the parent MZ interferometer are made equal to each other, the characteristic wavelength dependence in the signal light that has been multiplexed by the output optical multiplexing section 15 can also be reduced. Consequently, in the present optical modulator, it is possible to stabilize and output signal light corresponding to the optical modulation format of DQPSK or the like.

In the third embodiment, the application example is shown for where the DC electrodes or the like are added to the configuration of the first embodiment. However a similar application is also possible in the configuration of the second embodiment. Furthermore, the modulation light in the optical modulation sections 20A and 20B, is multiplexed into one by the output optical multiplexing section 15, and output. However similarly to the case of the first and second embodiments, the modulation light of the optical modulation sections 20A and 20B may of course also be output separately.

Next is a description of a fourth embodiment.

In the above mentioned first through third embodiments, the description was for an optical modulator in which two optical modulation sections were arranged in parallel on a single substrate. However the present invention is also applicable to a parallel arrangement of three or more optical modulation sections. Therefore, in the fourth embodiment, an application example is described for where, for example, four optical modulation sections are arranged in parallel on the same substrate.

Figure 9:
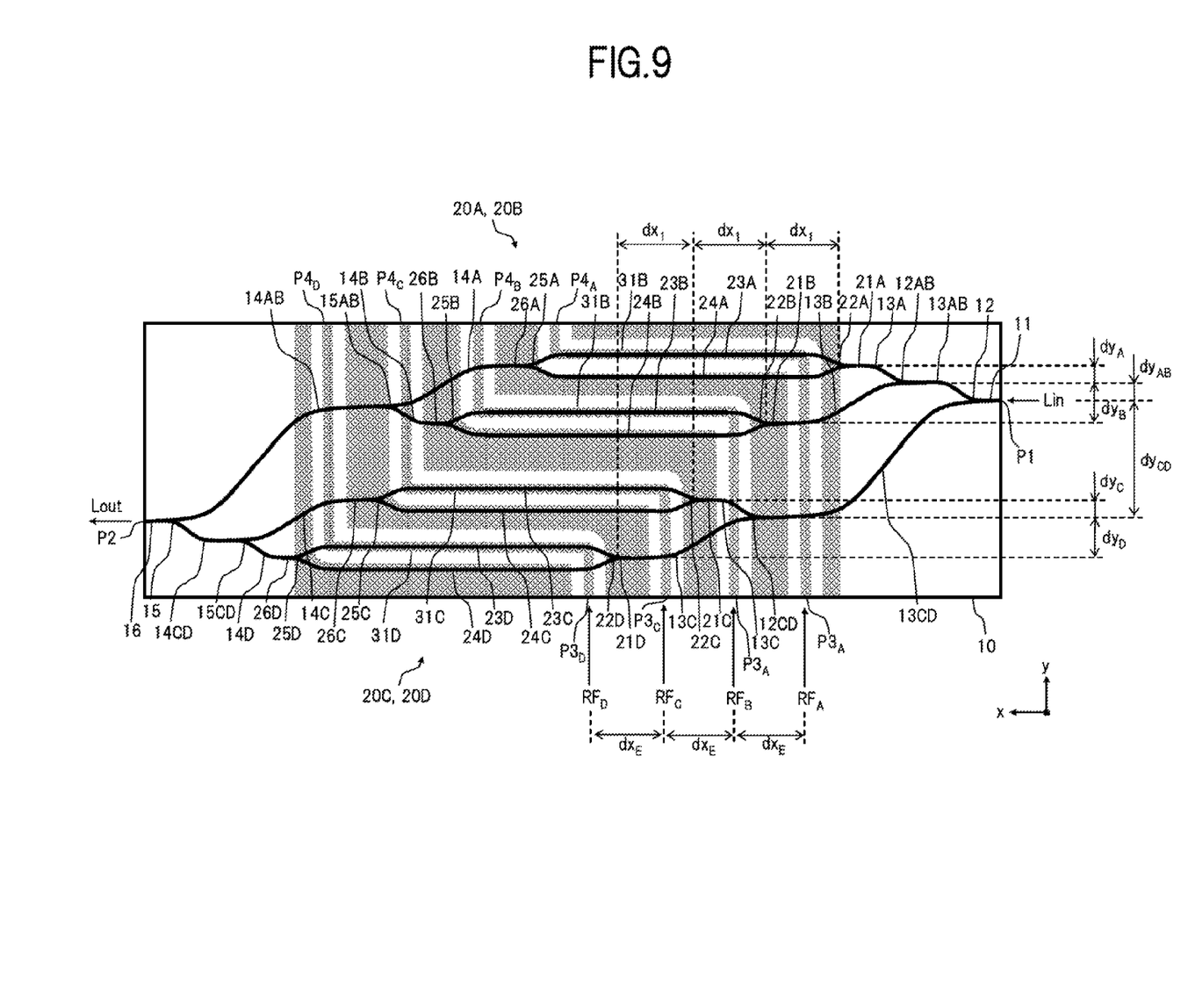
FIG. 9 is a plan view illustrating a configuration of an optical modulator according to a fourth embodiment.

FIG. 9 is a plan view illustrating a configuration of an optical modulator according to the fourth embodiment.

In FIG. 9, in the optical modulator of this embodiment, four optical modulation sections 20A, 20B, 20C, and 20D are arranged in parallel on a single crystal substrate 10 having an electro-optic effect. This optical modulator is provided with one input port P1 and one output port P2, and one end of a single input waveguide 11 is connected to the input port P1. The other end of the input waveguide 11 is connected to an input end of an input optical branching section 12, and to the two output ends of the input optical branching section 12 are respectively connected input ends of optical modulation sections 12AB and 12CD via curved waveguides 13AB and 13CB. To the two output ends of the input optical branching section 12AB are respectively connected the input ends of the optical modulation sections 20A and 20B via curved waveguides 13A and 13B. To the two output ends of the input optical branching section 12CD are respectively connected the input ends of the optical modulation sections 20C and 20D via curved waveguides 13C and 13D.

The optical modulation sections 20A and 20B and the optical modulation sections 20C and 20D, have a similar configuration to the optical modulation sections 20A and 20B in the aforementioned first embodiment. Furthermore, the relative positional relationship of the optical modulation section 20B and the optical modulation section 20C is similar to the relative positional relationship of the optical modulation section 20A and the optical modulation section 20B in the first embodiment.

That is, in the respective optical modulation sections 20A to 20D, the input ends $P3_A$ to $P3_D$ of each of the signal electrodes 31A to 31D are arranged side by side with spacings $dx_E$ on one side face, of the opposite side faces of the substrate 10, and the output ends $P4_A$ to $P4_D$ are arranged side by side on the other side face of the substrate 10. Moreover, the relative arrangement of the optical branching sections 22A to 22D on the substrate 10, in the x direction corresponds to the arrangement spacing $dx_E$ of the input ends of the respective signal electrodes 31A to 31D, with the optical branching section 22B displaced by $dx_1$ to the output side from the optical branching section 22A, the optical branching section 22C displaced by $dx_1$ to the output side from the optical branching section 22B, and the optical branching section 22D displaced by $dx_1$ to the output side from the optical branching section 22C. In the y direction, the positions of the respective optical branching sections 22A and 22B are displaced by $dy_A$ and $dy_B$ to either side of the input optical branching section 12AB ($dy_A < dy_B$), and the positions of the respective optical branching sections 22C and 22D are displaced by $dy_c$ and $dy_D$ to either side of the input optical branching section 12CD ($dy_c < dy_D$). Moreover, the positions of the respective optical branching section 12AB and 12CD are displaced by $dy_{AB}$ and $dy_{CD}$ to either side of the input optical branching section 12 ($dy_{AB} < dy_{CD}$).

Furthermore, as optical waveguides for multiplexing into one and outputting the respective modulation lights output from the output waveguides 26A to 26D of the respective optical modulation sections 20A to 20D, there are formed curved waveguides 14A to 14D, and 14AB and 14CD, output optical multiplexing sections 15AB, 15CD, and 15, and an output waveguide 16.

The respective curved waveguides 14A and 14B connect between the output waveguides 26A and 26B of the optical modulation section 20A and 20B, and the input ends of the output optical multiplexing section 15AB. The respective curved waveguides 14C and 14D connect between the output waveguides 26C and 26C of the optical modulation section 20C and 20D, and the input ends of the output optical multiplexing section 15CD. The respective curved waveguides 14AB and 14CD connect between the output ends of the output optical modulation section 15AB and 15CD, and the input ends of the output optical multiplexing section 15. Each of the curved waveguides 14A to 14D, 14AB, and 14CD have a gentle approximate S shape, and each have different lengths corresponding to the arrangement of the respective output optical multiplexing sections 15AB, 15CD, and 15. However, the radii of curvature of the respective curved waveguides 14A to 14D, and the radii of curvature of the curved waveguides 14AB and 14CD, are each approximately the same.

The output optical multiplexing section 15AB multiplexes into one, the modulation light that has passed through the curved waveguides 14A and 14B and been applied to the respective input ends, and output this to the curved waveguide 14AB. The output optical multiplexing section 15CD multiplexes into one, the modulation light that has passed through the curved waveguides 14C and 14D and been applied to the respective input ends, and output this to the curved waveguide 14CD. The output optical multiplexing section 15 further multiplexes into one, the modulation light that has passed through the curved waveguides 14AB and 14CD and been applied to the respective input ends, and output this to the output waveguide 16. In the output waveguide 16, the light that has been multiplexed by the output optical multiplexing section 15 is output to the outside from the output port P2 connected to the other end.

The relative arrangement of the output optical multiplexing sections 15, 15AB, and 15CD have a symmetrical relationship to the relative arrangement of the respective input optical branching sections 12, 12AB, and 12CD on the input side. As a result, the optical path length of the two pairs of (four) branch arms positioned between the input optical branching section 12 and the output optical multiplexing section 15 are equal to each other.

According to the optical modulator as described above, even if the four optical modulation sections 20A to 20D are arranged in parallel on a single substrate 10, and the input ends $P3_A$ to $P3_D$ of each of the signal electrodes 31A to 31D are arranged side by side with spacings $dx_E$ on one side face of the substrate 10, the input lights to the respective optical modulation sections 20A to 20D can be applied with low loss without incurring an increase in drive voltage or enlargement in substrate size. Furthermore, since the optical path lengths of the branch arms corresponding to the respective optical modulation sections 20A to 20D, positioned between the input optical branching section 12 and the output optical multiplexing section 15 are made equal to each other, the characteristic wavelength dependence in the signal light that has been multiplexed by the output optical multiplexing section 15 can also be reduced.

In the fourth embodiment, the modulation lights in the respective optical modulation sections 20A to 20D are multiplexed into one in the output optical multiplexing sections 15AB, 15CD, and 15, and output. However it is also possible for the modulation lights of the respective optical modulation section 20A to 20D to be output separately, or for the signal lights that have been multiplexed by the respective output optical multiplexing sections 15AB and 15CD to be output separately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising a plurality of optical modulation sections which are arranged in parallel on a same substrate having an electro-optic effect, in the respective optical modulation sections, a Mach-Zehnder type optical waveguide is formed on the substrate, and a signal electrode and an earth electrode are provided along a pair of branching waveguides that are disposed between an optical branching section and an optical multiplexing section of the Mach-Zehnder type optical waveguide, that perform modulation of light that propagates on the Mach-Zehnder type optical waveguide by applying an electric signal corresponding to modulation data to the signal electrode that is a travelling wave electrode, wherein:
   the optical modulator comprises;
   an input optical branching section that branches light input from a single input port arranged on an input end face of the substrate into a plurality of lights, and
   a plurality of curved waveguides that guide the lights branched by the input optical branching section to an input end of the Mach-Zehnder type optical waveguide of the respective optical modulation sections,
   and in the signal electrodes of the respective optical modulation sections, each of the input ends to which the electric signal is applied are arranged side by side with a predetermined spacing on one side face of opposite side faces that intersect with the input end face of the substrate,
   and the optical branching sections of the respective optical modulation sections are arranged shifted to the output side in a first direction parallel with the opposite side faces of the substrate, corresponding to the arrangement of the input ends of the signal electrodes.

2. An optical modulator according to claim 1, wherein the optical branching sections of the respective optical modulation sections, are arranged in a second direction orthogonal to the first direction, non symmetrically on either side of the input optical branching section with the spacings to the input optical branching section different from each other.

3. An optical modulator according to claim 1, wherein in the optical branching sections of the respective optical modulation sections, in the first direction, the spacing to the adjacent optical branching section is the same as the arrangement spacing of the input ends of the signal electrodes.

4. An optical modulator according to claim 1, wherein in the optical branching sections of the respective optical modulation sections, in the first direction, the spacing to the adjacent optical branching section is narrower than the arrangement spacing of the input ends of the signal electrodes,
and for the signal electrode of at least one of the optical modulation sections, an input leader line portion in which one end of a portion of the signal electrode along the pair of branching waveguides is extended to one side face of the substrate and made the input end, is wired at an incline with an angle with respect to the second direction.

5. An optical modulator according to claim 1, wherein in the plurality of curved waveguides, the radii of curvature are the same as each other.

6. An optical modulator according to claim 1, wherein for the signal electrodes of the respective optical modulation sections, lengths of input leader line portions in which one end of a portion along the pair of branching waveguides is extended to one side face of the substrate and made the input end, are the same as each other.

7. An optical modulator according to claim 6, wherein the signal electrode of at least one of the optical modulation sections includes a portion in which the input leader line portion is bent, and a spacing to an adjacent input leader line portion of another signal electrode is narrower than the arrangement spacing of the input ends.

8. An optical modulator according to claim 1, wherein the optical branching sections of the respective optical modulation sections are configured using a 2×2 optical coupler having two light input ends and two light output ends, and the curved waveguide is connected to a light input end that is closer to the input optical branching section, of the two light input ends of the 2×2 optical coupler.

9. An optical modulator according to claim 1, wherein the optical branching section and the optical multiplexing section of the respective optical modulation sections are each configured using a 2×2 optical coupler having two light input ends and two light output ends, and for the 2×2 optical couplers of the respective optical branching sections, light is applied to the light input ends positioned on the same side, of the two light input ends, and for the 2×2 optical couplers of the respective optical multiplexing sections, light is taken out from the light output ends positioned on the same side, of the two light output ends.

10. An optical modulator according to claim 1, wherein for the signal electrodes of the respective optical modulation sections, each of output ends connected to the earth electrode via a resistor are arranged side by side on the other side face, of the opposite side faces of the substrate.

11. An optical modulator according to claim 10, wherein in the signal electrode of the respective optical modulation sections, the spacing of the adjacent output ends is equal to the arrangement spacing of the input ends.

12. An optical modulator according to claim 1, wherein
in the optical modulation sections, DC electrodes for applying a bias voltage are respectively provided on a part where the signal electrode is not arranged on the pair of branching waveguides, and in the one direction, the DC electrodes are arranged sequentially displaced to an output side by a spacing corresponding to the arrangement spacing of the input ends of the signal electrode.

13. An optical modulator according to claim 1, comprising:
a plurality of curved waveguides to which is respectively applied modulation light output from the respective optical modulation sections; and
an output optical multiplexing section that multiplexes modulation lights propagated on the respective curved waveguides, and outputs the multiplexed light to one output port arranged on an output end face opposite to an input end face of the substrate.

14. An optical modulator according to claim 13, wherein
a relative arrangement of the optical branching sections of the respective optical modulation sections and the input optical branching section, and a relative arrangement of the optical multiplexing sections of the respective optical modulation sections and the output optical modulation section, have a symmetrical relationship in relation to a central point of a Mach-Zehnder interferometer formed between the input optical branching section and the output optical branching section.

15. An optical modulator according to claim 13, wherein
DC electrodes that apply a bias voltage, are respectively provided on the curved waveguides that connect between the optical multiplexing sections of the respective optical modulation sections and the output optical multiplexing section.

16. An optical modulator according to claim 15, wherein
a modulation format for the light output to the output port is DPQSK.

17. A light transmitting apparatus including an optical modulator according to claim 1, and a single light source, wherein output light of the light source is input to an input port of the optical modulator.

* * * * *